Patented Sept. 22, 1942

2,296,442

UNITED STATES PATENT OFFICE 2,296,442

BRAZING FLUX COMPOSITION

Oskar Horowitz, Brooklyn, N. Y., assignor to Albert I. Elias, New York, N. Y.

No Drawing. Application February 23, 1940,
Serial No. 320,415

7 Claims. (Cl. 148—26)

This invention relates to a brazing flux utilizable for both ferrous and non-ferrous metals.

In my copending application Serial No. 302,873, filed November 4, 1939 now Patent No. 2,243,424, I disclose a new flux composition for welding and soldering aluminum, the said composition possessing the improved characteristic of lowering to a substantial extent the melting point of the aluminum. I have found that this aluminum flux composition may be compounded with borates and the like to produce a brazing flux suitable for both ferrous and non-ferrous metals, which brazing flux possesses the new and improved characteristics of the said aluminum flux composition. I have also found that this brazing flux may be so compounded as to entirely eliminate the evolution of noxious fumes which have hitherto been an objection in the use of brazing fluxes of this character. The prime object of my present invention resides in the provision of such an improved brazing flux utilizable for both ferrous and non-ferrous metals.

A good brazing flux should posses the following interrelated characteristics: (1) It should cleanse the oxide which exists on the surface to be brazed and prevent further oxidation at the brazing temperatures, (2) it should make the slag easy flowing, that is, it should assist the flow of the melting brazing material, (3) it should lower by a substantial amount the melting point of the brazing material, (4) it should be free of noxious fumes, and (5) it should have wide limits of applicability so that it may be utilized with a variety of metals both ferrous and non-ferrous and serve for brazing temperatures over a fairly wide range. Existing brazing fluxes are known which possess some of these characteristics; and the brazing flux of the present invention differs from these because it possesses all of these characteristics and possesses them to a marked degree.

To perform the function of cleansing the oxides existing on the surface to be brazed, and for preventing further oxidation on this surface at the brazing temperatures, an alkali borate and an alkali acid fluoride have been used in these brazing fluxes. The fluoride possesses in the main the function of cleansing the brazing surface and the borate possesses in the main the function of fusing to the brazing surface so as to inhibit further oxidation. The fluoride, however, when used in the customary amounts produces noxious fumes which are decidedly objectionable. These brazing fluxes are customarily employed with so-called silver solder as the brazing material, and a well known objection thereto has always been the fear of the health of the worker due to the evolving noxious fumes or gases. I have found that this type of brazing flux may be compounded so that a very small amount of the alkali acid fluoride is used, sufficient in conjunction with the other ingredients employed to fully assist in and perform the cleansing and fusing functions, but insufficent in amount to give rise to the objectionable noxious fumes and gases. More particularly, I have discovered that this alkali acid fluoride ingredient may be employed in an amount by weight of the flux composition less than 10% and even preferably as low as 1½%, and that when the same is used in these small amounts in conjunction with the other ingredients, the full cleansing and fusing action takes place without the production of the noxious fumes.

The functions of making the slag easier flowing and of lowering by a substantial amount the melting point of the brazing material are accomplished by the use of halogenides of certain alkali metals and halogenides of certain metals. The halogenides of the alkali metals may be, for example, halogenides of potassium, sodium, lithium, cesium and rubidium, either alone or a mixture thereof; and the halogenides of the metals are preferably a halogenide of cadmium combined with a halogenide of copper. To assist in the function of making the slag easier flowing, a holagenide of a rare earth metal is also used. When alkali metal and metal halogenides are combined in suitable proportions with the borate and the alkali acid fluoride, there results the brazing flux composition which possesses to a marked degree all of these four described characteristics combined with the capability of the composition for wide application to metals of both the ferrous and non-ferrous type over temperatures of a fairly wide range.

The following is an example of the brazing flux composition embodying the present invention, the percentages being given by weight:

| | Per cent |
|---|---|
| Alkali borate | 20 |
| Boric acid | 10 |
| Sodium tetraborate (borax) | 10 |
| Potassium acid fluoride | 1½ |
| Sodium chloride | 6½ |
| Potassium chloride | 33½ |
| Lithium chloride | 1 |
| Cerous chloride | 5½ |
| Cadmium chloride | 8 |
| Cuprous chloride | 24 |

The alkali borate, which may be sodium tetraborate or potassium tetraborate, preferably comprises about 20% by weight of the composition. I have found that for the borate there should preferably be used an equal mixture by weight of boric acid and borax (sodium tetraborate). The alkali acid fluoride preferably comprises potassium acid fluoride, and this is used in an amount anywhere below 10% of the composition by weight, and preferably as low as 1½%. By the use of these ingredients, and preferably in these relative proportions, and with the extremely low amount of potassium acid fluoride, when combined with the other ingredients, there results, as hereinbefore set forth, a brazing flux which is fully capable of the oxide cleansing and oxide preventing action with all tendency towards noxious fumes evolution eliminated or inhibited.

The alkali metal halogenides may, as given in the foregoing example, comprise sodium chloride, potassium chloride and lithium chloride, preferably in the proportions given. In general, these halogenides act to make the slag easier flowing, that is to say, they assist in causing the flow of the melting or molten brazing material. The halogenides of the rare earth metal, namely cerous chloride, also assists in performing this function, the cerous chloride having the additional characteristic of stabilizing the composition. The halogenides of the alkali metals may be used between 10% to 50% by weight of the total composition, and in lieu of the chlorides given in the above example, I may use the bromides, the iodies, the fluorides or a mixture of these.

The main function of the halogenides of the metals, that is to say, the halogenides of cadmium and copper, is to effect the lowering of the melting point and in this the halogenide of lithium is of assistance. I have found that both cadmium chloride and cuprous chloride should be used together in the composition to produce this result, and preferably I employ the cadmium chloride and the cuprous chloride in the proportions of 1 to 3 as given in the above example. Instead of cadmium chloride and cuprous chloride, I may use other halogenides thereof such as the bromides, the iodides and the fluorides of cadmium and copper or a mixture of these.

The rare earth metal halogenide, such as cerous chloride, may be used in the composition in the proportion of from 1% to 15% of the same, and preferably, as in the example given, I use this ingredient in the proportion of about 5½ by weight of the mix.

This brazing flux composition possesses wide limits of application. It may be used with substantially equal efficacy for iron and steel, stainless steel, copper, brass, bronze, Monel metal, nickel, cobalt alloys, German silver, and silver, and practically all ferrous and non-ferrous metals with the exception of aluminum and magnesium. Different brazing metals may be used, the brazing metal being usually brass when brazing iron and steel, brass or silver solder when brazing copper, brass or Monel metal, and usually silver solder when brazing nickel, stainless steel and cobalt alloys. The brazing temperatures, which depend upon the particular brazing medium employed, may run from about 900° F. to 1600° F., and it is found that the employed temperatures for any given metal are of a melting point substantially lower than the melting points employed with other brazing fluxes of this character.

The brazing flux composition of my present invention and the uses and advantages thereof will, in the main, be fully apparent from the above-detailed description thereof. It will be further apparent that I may make changes in the relative proportions of the ingredients of the composition and substitutions of equivalents of these ingredients, all as described above, without departing from the spirit of the invention defined in the following claims.

I claim:

1. A brazing flux comprising an alkali borate, an alkali acid fluoride, halogenides of cadmium and copper, and halogenides of alkali metals.

2. A brazing flux comprising an alkali borate, an alkali acid fluoride, halogenides of cadmium and copper, a halogenide of a rare earth metal, and halogenides of alkali metals.

3. The brazing flux of claim 1 in which the halogenide of cadmium and the halogenide of copper are in the proportion of 1 to 3 and in which the alkali acid fluoride is below 10% by weight of the flux.

4. A brazing flux comprising by weight, borax and boric acid about 20%; potassium acid fluoride about 1½%; halogenides of cadmium and copper in the proportion of 1 to 3 about 30%; and halogenides of alkali metals about 40%.

5. A brazing flux comprising by weight, borax and boric acid about 20%; potassium acid fluoride about 1½%; halogenides of cadmium and copper about 30%; a halogenide of a rare earth metal about 5½%; and halogenides of alkali metals about 40%.

6. A brazing flux comprising an alkali borate, an alkali acid fluoride; halogenides of cadmium and copper; and halogenides of sodium, potassium, lithium and cerium.

7. A brazing flux comprising, borax and boric acid; potassium acid fluoride; halogenides of cadmium and copper; and halogenides of alkali metals.

OSKAR HOROWITZ.